Aug. 26, 1969 L. J. BAZIN 3,463,962

REMOTE CONTROL FOR DEFLECTION SYSTEM OF A TELEVISION CAMERA

Filed Oct. 17, 1968 2 Sheets-Sheet 1

INVENTOR
Lucas J. Bazin
BY Eugene M. Whitacre
ATTORNEY

INVENTOR
Lucas J. Bazin
BY Eugene M. Whitacre
ATTORNEY

United States Patent Office 3,463,962
Patented Aug. 26, 1969

3,463,962

REMOTE CONTROL FOR DEFLECTION SYSTEM OF A TELEVISION CAMERA

Lucas J. Bazin, Stratford, N.J., assignor to Radio Corporation of America, a corporation of Delaware Filed Oct. 17, 1968, Ser. No. 768,255
Int. Cl. H01j 29/70
U.S. Cl. 315—24 6 Claims

ABSTRACT OF THE DISCLOSURE

In a television camera, apparatus is provided for remotely controlling the deflection system of the camera. DC voltages at the remote control location are adjustably selected and sent along a cable to the camera at which the DC voltages control the vertical and horizontal centering of the raster and control waveforms which correct the height, width, linearity and skew of the raster.

BACKGROUND OF THE INVENTION

Figure 1:
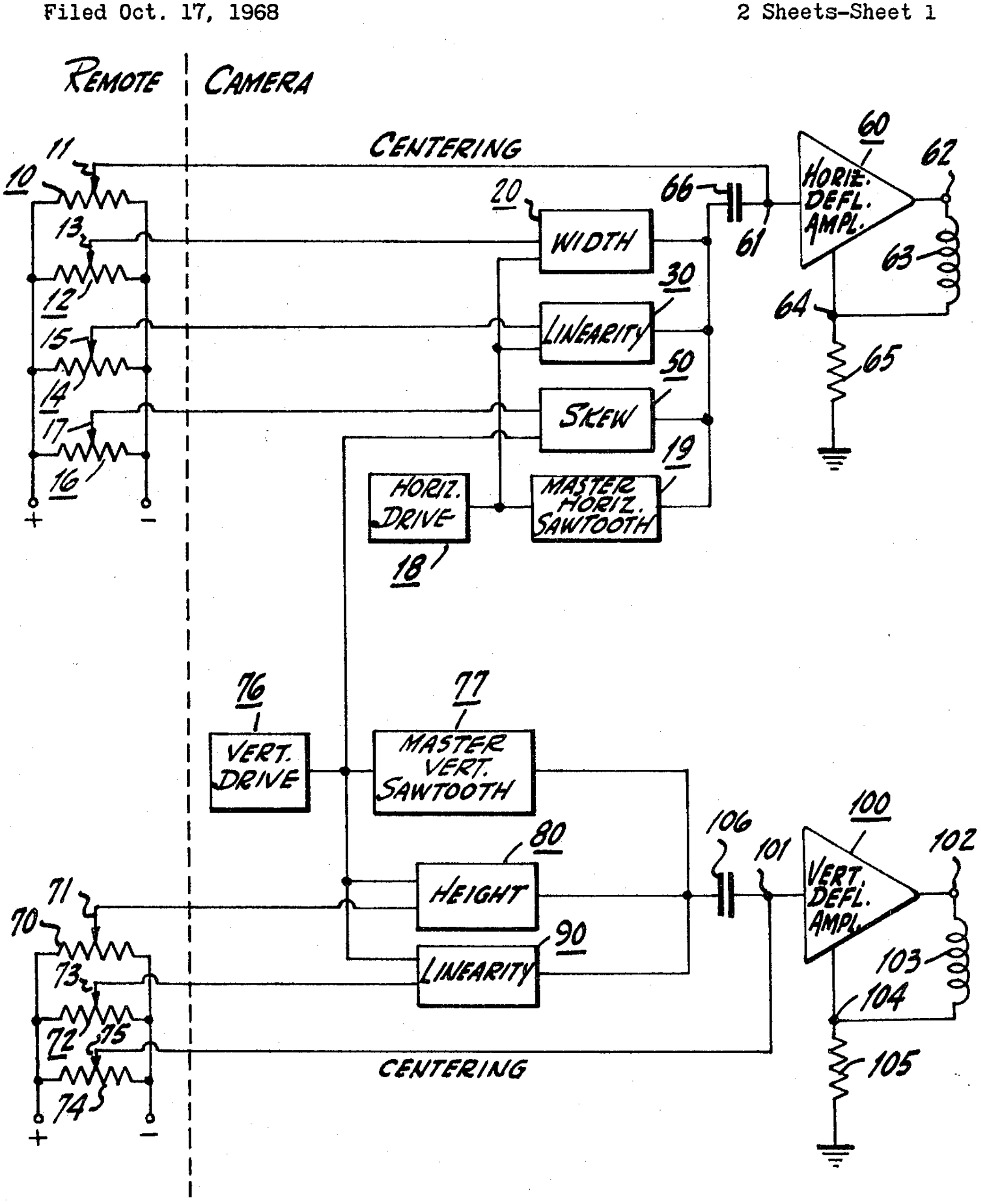

This invention relates to apparatus for remotely controlling the height, width, centering linearity, and skew of a raster formed in a pickup tube of a television camera.

In setting up a television camera, it is necessary to adjust the deflection circuits and components to produce a substantially rectangular raster of proper size and linearity.

In setting up a color television camera containing more than one image pickup tube for deriving color video signals, it is necessary to register the camera so that the rasters formed by the individual pickup tubes are as nearly identical as possible in size, shape and relative position in order to yield a high quality picture on the kinescope of the receivers tuned to the broadcasting station transmitting the color signal.

To register a multiple-tube color camera it is usual to select one color channel, green, for example, as a reference channel and view the monitor screen located at the camera while adjusting the raster for proper height, width, centering, linearity and skew by manipulating controls located at the camera. Then the red and blue channels are each adjusted so their respective rasters are as nearly identical as possible to the green channel raster.

It is recognized that there are factors which make it undesirable to register a camera by viewing the monitor located at the camera and adjusting the controls located at the camera. For example, the monitor screen at the camera is usually small, thereby making it difficult for the camera operator to see enough detail to enable him to achieve proper registration. Also, the camera may be so located that adverse weather conditions and extremes in temperature may affect the camera operator's ability to achieve proper registration. Therefore, it is desirable to register the camera at a location remote from the camera where there is a comfortable environment and a large monitor screen to facilitate achieving proper registration.

It is known that horizontal and vertical centering of the raster may be accompilshed by adjusting the direct current through the windings of the deflection coils. It is also known that the height and width of the raster may be adjusted by varying the amplitude of the respective vertical and horizontal sawtooth deflection waveforms, and that raster skew may be corrected by adding a sawtooth waveform at the field rate to the horizontal deflection waveform. Also, it is known that the linearity of the raster may be adjusted by the addition of parabolic waveforms at the field and line rates to the respective vertical and horizontal deflection waveforms. For the remote control of the camera waveforms, it is desirable to provide only DC (direct current) energized apparatus at the remote location which can then be simply connected by cable of any desired length to the camera. That is, if AC control waveforms are sent along the cables there frequently would be crosstalk between the signals thus sent. This undesirable condition would require special shielding of the camera cable. Also, varied cable lengths used between the camera and remote control location would present different impedances to the AC waveform and would produce distortion of the correcting waveforms, particularly at the line scanning frequency. The amount of distortion is a function of cable length and would have to be corrected accordingly.

SUMMARY TO THE INVENTION

In a color television system, apparatus is provided for remotely controlling the deflection system of a camera. DC control means are located at a monitoring facility remote from the camera. DC control voltages are sent via an interconnecting cable to raster correction waveform generators located in the camera. The DC voltages control the amplitude and polarity of raster, height, width, linearity and skew correction waveforms which are added to the master vertical and horizontal deflection waveforms at the camera. The corrected master deflection waveforms are applied to deflection amplifiers which provide the driving waveforms for the pickup tube deflection coils.

It is an object of this invention to provide improved apparatus for remotely controlling the deflection system of a television camera.

Figure 2:
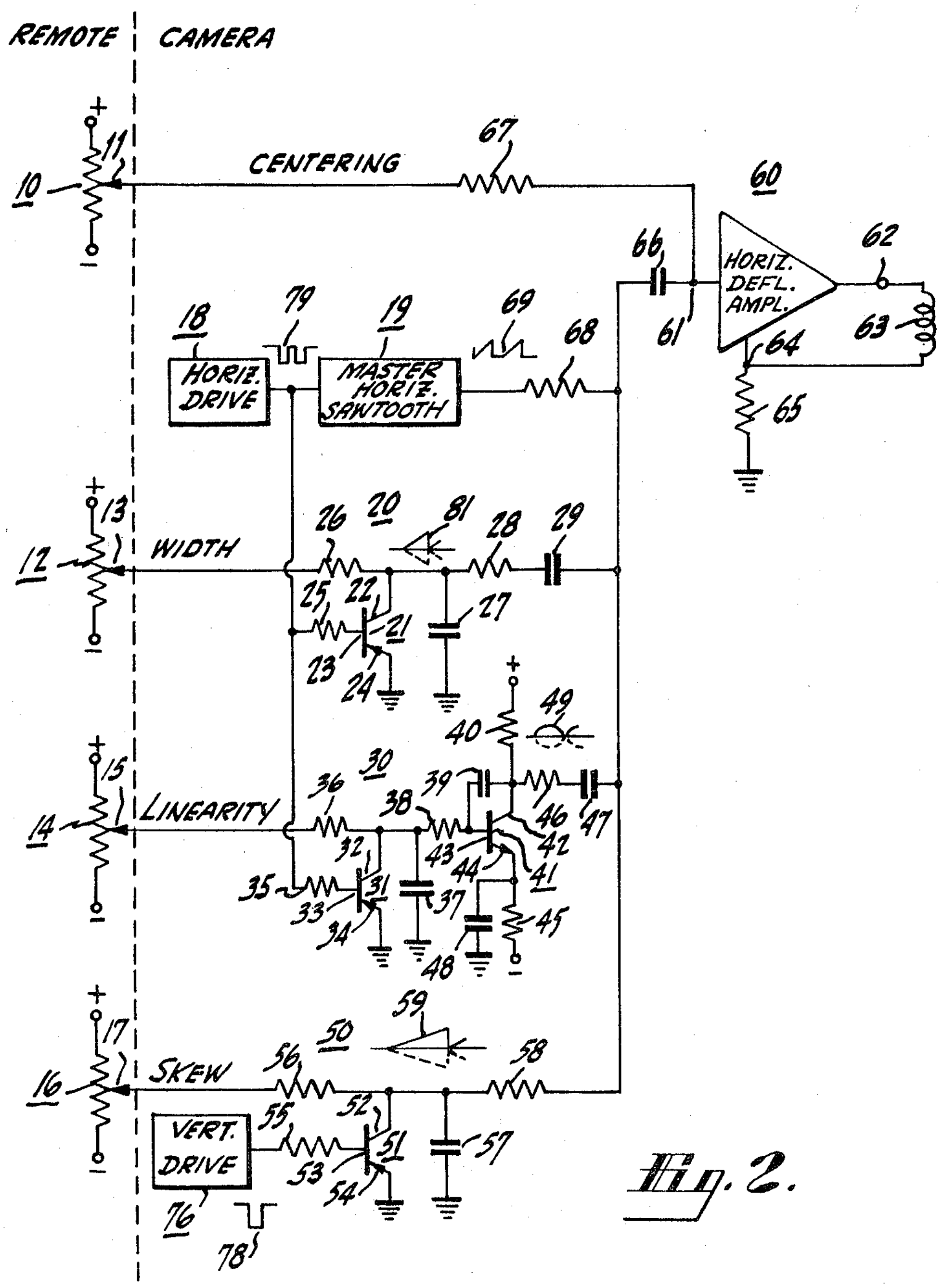

The invention is more fully described in the following specification taken in conjunction with the accompanying drawings in which:

FIGURE 1 is a partial block diagram of a television camera including a deflection control system in accordance with the invention; and FIGURE 2 is a block and schematic diagram of the deflection control system shown in FIGURE 1.

DESCRIPTION OF THE INVENTION

The invention will be described in connection with a color television camera, an environment in which it is particularly useful.

FIGURE 1 shows that portion of a deflection system necessary to control remotely the raster of one color channel of a multiple pickup tube television camera. In apparatus embodying the present invention there would normally be separate vertical and horizontal control circuits for each of the color channels, but the deflection control apparatus for effecting the vertical and horizontal control of each of the channels would be similar, so, for descriptive purposes, only the apparatus for effecting vertical and horizontal control of one channel is shown.

FIGURE 1 is divided by a dotted line; the area on one side of the line being labeled "remote" and the area on the other side of the line being labeled "camera." The remote area may be a monitoring facility such as a studio control room or a mobile control van located some distance from the television camera. The monitoring facility would have a more stable temperature and weather environment than that of the camera and would have at least one large monitor display for each camera. Four horizontal deflection control potentiometers, 10, 12, 14, and 16, are located in the remote monitoring facility, as are three vertical deflection control potentiometers 70, 72, and 74. Cables connect the camera to the monitoring facility, and the deflection controls in the monitoring facility are electrically connected to the camera by individual conductors of the cables.

Each of the potentiometers 10, 12, 14, and 16 is connected between positive and negative DC voltage sources. A wiper arm 11 of potentiometer 10 is coupled to an input terminal 61 of a horizontal deflection amplifier 60 to provide the DC horizontal centering control voltage. Wiper arms 13, 15, and 17 of respective potentiometers 12, 14, and 16 are coupled respectively to circuits represented by blocks 20, 30, and 50 to control the horizontal raster width, linearity, and skew.

A horizontal drive generator, represented by block 18, provides pulses at the horizontal line scanning rate which are coupled to raster control circuits 20 and 30 and a master horizontal sawtooth generator 19. Generator 19 provides the main deflection sawtooth waveform which is used for horizontal deflection in all three color channels of the camera.

A vertical drive generator, represented by block 76, provides pulses at the vertical scanning rate which are coupled to vertical raster control circuits 80 and 90, and a vertical master sawtooth generator 77. The vertical drive pulses are also coupled to a horizontal raster skew control circuit 50 to produce a skew correction waveform in a manner to be described.

The horizontal raster correction waveforms generated by circuits 20, 30, and 50 are added to the master horizontal sawtooth waveform, and the corrected master sawtooth waveform is coupled by a capacitor 66 to an input terminal 61 of horizontal diflection amplifier 60. An output terminal 62 of amplifier 60 is connected to one side of a horizontal deflection coil 63. The other side of deflection coil 63 is connected to a feedback terminal 64 of amplifier 60. A resistor 65 is connected between terminal 64 and ground and samples the deflection coil current and is used to develop a feedback signal.

Each of the vertical raster control potentiometers 70, 72, and 74 is connected between positive and negative DC voltage sources at the remote control location.

Wiper arm 75 of potentiometer 74 is coupled to input terminal 101 of vertical deflection amplifier 100 to provide the DC vertical centering control voltage. Wiper arms 71 and 73 of respective potentiometers 70 and 72 are coupled respectively to height control circuit 80 and linearity control circuit 90.

Vertical drive pulses from vertical drive generator 76 are coupled to vertical height control circuit 80 and vertical linearity control circuit 90, and also to the master vertical sawtooth generator 77. The vertical master sawtooth waveform is the main deflection waveform for the vertical deflection coils of all three color channels.

The vertical raster correction waveforms generated by control circuits 80 and 90 are added to the master vertical sawtooth waveform and coupled through capacitor 106 to input terminal 101 of vertical deflection amplifier 100. Vertical deflection coil 103 is coupled between output terminal 102 of amplifier 100 and feedback terminal 104 of amplifier 100. Resistor 105 is connected between feedback terminal 104 and ground and develops a feedback voltage from the deflection coil current passing through it.

FIGURE 2 shows circuitry for correcting the horizontal centering width, linearity, and skew of the raster for one color channel. Vertical raster correction is accomplished by similar circuitry so only the operation of the horizontal circuitry will be described. It should be noted that skew correction is provided only in the horizontal channel. Those elements performing the same function in FIGURE 2 as in FIGURE 1 retain the reference numerals used in FIGURE 1.

A selected DC voltage appearing at the wiper arm 11 of horizontal centering potentiometer 10 is coupled by a cable between the remote control location and the camera and through resistor 67 to input terminal 61 of amplifier 60. The DC voltage is amplified by amplifier 60 and appears at output terminal 62 at the voltage level necessary to center the raster in the horizontal sense on the monitor screen. By applying the control voltage to the input of amplifier 60 and utilizing its power gain to provide the necessary control current through the deflection coil 63, the power requirements of the remotely generated control signal are reduced. Also, the feedback signal derived from the current through the deflection coil 63 stabilizes the output of the amplifier and ensures a constant DC current through the deflection coil 63.

The horizontal drive generator 18 produces the horizontal drive pulses 79. The input, not shown, to the horizontal drive generator may be a train of pulses at the horizontal line scanning rate, such as the horizontal synchronizing pulses, for example. The drive pulses 79 are coupled to the bases of transistors 21 and 31. Also, the drive pulses are coupled to the master horizontal sawtooth generator 19, which produces the main horizontal sawtooth deflection waveform 69 such that the correction waveforms are generated in synchronism with the main deflection waveform.

Horizontal deflection amplifier 60 may be any commercially available amplifier having provision for application of a feedback signal from the output to the input and being able to provide a sawtooth waveform and a DC current sufficient to drive a particular deflection coil. In the described embodiment of this invention an RCA Model CA 3015 operational amplifier is used in conjunction with a conventional transistor power output stage to provide a peak to peak sawtooth deflection current of a nominal 235 milliamperes.

The width control circuit 20 includes a transistor 21 having its emitter electrode 24 connected to ground, its base electrode 23 coupled through resistor 25 to the source of horizontal drive pulses 79, and its collector electrode 22 coupled through load resistor 26 to the wiper arm 13 of the remotely controlled width potentiometer 12. Capacitor 27 is coupled between collector electrode 22 and ground. Resistor 28 and coupling capacitor 29 are serially connected between the junction of collector 22, resistor 26 and capacitor 27, and one side of capacitor 66 remote from amplifier 60.

During operation, capacitor 27 charges through resistor 26 towards the voltage appearing at the wiper arm 13 of potentiometer 12. This voltage may be positive or negative depending on the adjustment of potentiometer 12. Horizontal drive pulses 79 are applied to the base 23 of transistor 21 at the horizontal line scanning rate. The pulses 79 cause transistor 21 to conduct periodically, thereby providing a discharge path for capacitor 27. Thus, the charging and discharging of capacitor 27 produces a sawtooth waveform 81 at the collector 22 of transistor 21. Transistor 21 is capable of conducting current in both directions, and may be a type 2N3640, for example. The amplitude and polarity of the sawtooth waveform 81 is determined by the adjustment of potentiometer 12. The sawtooth is coupled through resistor 28 and capacitor 29 to be combined with the master horizontal sawtooth waveform 69 provided by generator 19. The width correction sawtooth waveform 81, when combined with the master horizontal sawtooth waveform 69, varies the deflection waveform applied to deflection coil 63 and thereby varies the width of the raster, by an amount determined by the setting of potentiometer 12.

The horizontal linearity control circuit 30 includes transistors 31 and 41. Emitter electrode 34 of transistor 31 is connected to ground. Base electrode 33 is coupled through resistor 35 to the source of horizontal drive pulses 79. Collector electrode 32 of transistor 31 is coupled through load resistor 36 to the wiper arm 15 of remotely located linearity control potentiometer 14. Capacitor 37 is connected between collector electrode 32 and ground.

Emitter electrode 44 of transistor 41 is connected to one end of resistor 45, the other end of which is connected to a negative voltage source. Bypass capacitor 48 is connected between emitter electrode 44 and ground. Base electrode 43 of transistor 41 is coupled through resistor 38 to the junction of capacitor 37, resistor 36, and collector electrode 32 of transistor 31. The collector electrode 42 of transistor 41 is connected to one end of load resistor 40. The other end of resistor 40 is connected to a positive voltage source. Integrating capacitor 39 is connected between the base and collector electrodes 42 and 43 of transistor 41. Collector electrode 42 is also connected to serially-connected resistor 46 and capacitor 47. Capacitor 47 is connected to the side of capacitor 66 remote from amplifier 60.

During operation, capacitor 37 charges towards the voltage appearing at the wiper arm 15 of potentiometer 14. The horizontal drive pulses 79 applied to the base of transistor 31 cause transistor 31 to conduct periodically, thereby providing a discharge path for capacitor 37. Thus, a sawtooth waveform at the horizontal line scanning rate is produced at the collector electrode 32. Transistor 31 is similar to transistor 21 and may conduct current in either direction. The amplitude and polarity of the sawtooth waveform is determined by the setting of potentiometer 14. The sawtooth waveform is coupled through resistor 38 to the base-emitter circuit of transistor 41. Transistor 41 in conjunction with capacitor 39 integrates the sawtooth waveform applied to base electrode 43, and produces a parabolic waveform 49 at the collector electrode 42. This parabolic waveform 49 is coupled through resistor 46 and capacitor 47 to be combined with the master horizontal sawtooth waveform 69 at the side of capacitor 66 remote from amplifier 60. The linearity of the raster is corrected by combining the parabolic waveform with the master sawtooth deflection waveform. The amplitude and polarity of the parabolic waveform 49 is determined by the amplitude and polarity of the sawtooth waveform produced at the collector electrode 32 of transistor 31, the amplitude and polarity of which sawtooth waveform is controlled by the setting of remotely located potentiometer 14.

Skew of the raster is corrected by skew correction circuit 50. Transistor 51 is the active element of the circuit. Emitter electrode 54 is connected to ground. The source 76 of vertical drive pulses 78 is coupled through resistor 55 to base electrode 53. Collector electrode 52 is coupled through load resistor 56 to the wiper arm 17 of remotely located skew control potentiometer 16. Capacitor 57 is connected between the collector electrode and ground. Resistor 58 is connected between the junction of resistor 56, collector 52 and capacitor 57, and the side of capacitor 66 remote from amplifier 60.

During operation, capacitor 57 charges through resistor 56 towards the voltage appearing at the wiper arm 17. The vertical drive pulses 78 produced by generator 76 (e.g., a standard vertical sync pulse generator) are applied to the base electrode 53 and cause transistor 51 to conduct periodically, thereby providing a discharge path for capacitor 57. Thus, the charging and discharging of capacitor 57 produces a sawtooth waveform 59 at the field rate to appear at collector electrode 52 of transistor 51. Transistor 51 is similar to transistors 21 and 31 and is capable of conducting current in either direction. The amplitude and polarity of the sawtooth wavefore 59 is determined by the setting of potentiometer 16. The sawtooth waveform 59 at the field rate is coupled through resistor 58 to be combined with the master horizontal sawtooth waveform 69. The sawtooth waveform at the field rate is of greater duration than the horizontal deflection sawtooth waveform with which it is combined, so the instantaneous value of the field rate sawtooth waveform is added to each horizontal rate sawtooth waveform, thereby imparting a corrective tilt to the raster to maintain a rectangular raster. The direction of tilt is determined by the setting of potentiometer 16. The range of skew control is determined by the range of adjustment of potentiometer 16.

The addition of the width, linearity and skew correction waveforms to the master horizontal deflection sawtooth waveform for one color channel has been described. The operator at the remote monitor location adjusts similar controls for horizontal control of each of the other color channels. Similarly, three control circuits corresponding to height, vertical linearity and vertical centering are provided for each of the three color channels to provide vertical raster control. The same master vertical and horizontal deflection waveforms are used to drive the respective vertical and horizontal deflection circuits of all three color channels, so a variation in the master waveform will affect all three color channels similarly. By adding the raster corrections to the deflection waveforms at the input of the respective vertical and horizontal deflection amplifiers, the feedback path of the deflection amplifiers further stabilizes the corrected deflection waveforms to ensure proper registration of the rasters.

What is claimed is:

1. In a television system, apparatus for remotely controlling the deflection system of a camera, comprising:
   - a source of master deflection waveforms,
   - means for generating raster correction waveforms,
   - control means for producing direct current control signals located remotely from said source and said generating means,
   - means for coupling said control signals to said correction waveform generating means,
   - said remotely located control means controlling the generation of said correction waveforms,
   - means coupled to said source and said generating means for combining said raster correction waveforms and said master deflection waveforms, and
   - deflection means coupled to said combining means.

2. Apparatus according to claim 1 wherein said remotely located control means include at least one potentiometer adapted to be connected between positive and negative voltage sources, the wiper arm of said at least one potentiometer being coupled to said means for generating raster correction waveforms.

3. Apparatus according to claim 2 wherein said source of master deflection waveforms provides master horizontal deflection waveforms and master vertical deflection waveforms, and wherein said means for generating raster correction waveforms includes;
   - width control means for generating sawtooth waveforms at the horizontal scanning rate to combine with said master horizontal deflection waveforms to control the width of said raster,
   - height control means for generating sawtooth waveforms at the vertical scanning rate to combine with said master vertical deflection waveforms to control the height of said raster,
   - linearity control means for generating parabolic waveforms at the horizontal scanning rate to combine with said master horizontal deflection waveform to control the linearity of said raster,
   - linearity control means for generating parabolic waveforms at the vertical scanning rate to combine with said master vertical deflection waveform to control the linearity of said raster, and
   - skew control means for generating sawtooth waveforms at the vertical scanning rate to combine with said master horizontal deflection waveform to control the skew of said raster.

4. Apparatus according to claim 3 wherein said remotely located control means includes one potentiometer coupled to each of said means for generating said raster correction waveforms.

5. Apparatus according to claim 4 wherein the adjustably selectable DC potential at the wiper arm of each of said potentiometers determines the amplitude and polarity of the raster correction waveforms obtained from said means for generating said raster correction waveforms to which respective ones of said potentiometers are coupled.

6. Apparatus according to claim 5 wherein said deflection means includes an amplifier, said amplifier having negative feedback means coupled from the output terminal to the input terminal of said amplifier for stabilizing said corrected deflection waveforms.

References Cited

UNITED STATES PATENTS 3,379,833 4/1968 Hecker et al. ------- 315—24 X

RODNEY D. BENNETT, Jr., Primary Examiner

T. H. TUBBESING, Assistant Examiner

U.S. Cl. X.R.

315—26